United States Patent
Roys et al.

(10) Patent No.: US 11,608,942 B2
(45) Date of Patent: Mar. 21, 2023

(54) CUPPED END CAP FOR AN LED SUPPORT

(71) Applicants: Curtis Alan Roys, Fredericksburg, TX (US); Sidney Howard Norton, Odessa, TX (US)

(72) Inventors: Curtis Alan Roys, Fredericksburg, TX (US); Sidney Howard Norton, Odessa, TX (US)

( * ) Notice: Subject to any disclaimer, the term of this patent is extended or adjusted under 35 U.S.C. 154(b) by 0 days.

(21) Appl. No.: 17/512,091

(22) Filed: Oct. 27, 2021

(65) Prior Publication Data
US 2022/0154893 A1 May 19, 2022

Related U.S. Application Data

(62) Division of application No. 29/780,940, filed on Apr. 27, 2021, which is a division of application No. 29/719,529, filed on Jan. 6, 2020, now Pat. No. Des. 917,776, which is a division of application No. 29/641,063, filed on Mar. 19, 2018, now Pat. No. Des. 872,353, which is a division of application No. 15/219,246, filed on Jul. 25, 2016, now Pat. No. 10,222,005, which is a division of application No. 29/568,321, filed on Jun. 16, 2016, now Pat. No. Des. 811,627.

(60) Provisional application No. 62/196,732, filed on Jul. 24, 2015, provisional application No. 62/196,813, filed on Jul. 24, 2015.

(51) Int. Cl.
| | | |
|---|---|---|
| *F21K 9/27* | (2016.01) | |
| *F21V 23/00* | (2015.01) | |
| *F21K 9/272* | (2016.01) | |
| *H01R 33/08* | (2006.01) | |
| *F21V 23/06* | (2006.01) | |
| *F21Y 115/10* | (2016.01) | |
| *F21V 19/00* | (2006.01) | |
| *F21Y 107/30* | (2016.01) | |

(52) U.S. Cl.
CPC ............ *F21K 9/27* (2016.08); *F21K 9/272* (2016.08); *F21V 23/003* (2013.01); *F21V 19/008* (2013.01); *F21V 23/06* (2013.01); *F21Y 2107/30* (2016.08); *F21Y 2115/10* (2016.08); *H01R 33/08* (2013.01); *Y02B 20/30* (2013.01)

(58) Field of Classification Search
CPC ................................ F21K 9/272; F21V 23/06
See application file for complete search history.

(56) References Cited

U.S. PATENT DOCUMENTS 7,052,171 B1 * 5/2006 Lefebvre ............... F21K 9/27
362/651
7,556,396 B2 * 7/2009 Kuo ..................... F21K 9/65
362/240

(Continued)

*Primary Examiner* — William N Harris
(74) *Attorney, Agent, or Firm* — Michael Scheinberg; Scheinberg & Associates, PC (57) ABSTRACT

An end cap for mounting an LED support in a sign cabinet comprises a support-mating portion for mating with an LED support, the support-mating portion including a hollow portion into which an LED support can be inserted and a protruding portion that protrudes into the LED support; and a cabinet-contacting portion opposite to the support-mating portion, the cabinet-contacting portion including a cup section for contacting the cabinet and supporting the end cap and LED support within the cabinet.

6 Claims, 7 Drawing Sheets

(56) References Cited

U.S. PATENT DOCUMENTS

| | | | |
|---|---|---|---|
| 8,232,724 B2* | 7/2012 | Mostoller | H01R 33/94 362/217.13 |
| 2009/0073693 A1* | 3/2009 | Nall | G09F 13/04 362/249.02 |
| 2016/0123543 A1* | 5/2016 | He | F21K 9/65 362/221 |

* cited by examiner

Section A—A

Section B—B

CUPPED END CAP FOR AN LED SUPPORT

This application is a divisional of U.S. Design patent application 29/780,940, filed Apr. 27, 2021, which is a divisional of U.S. Design patent application 29/719,529, filed Jan. 6, 2020, which is a divisional of U.S. Design patent application 29/641,063, filed Mar. 19, 2018, which is a divisional of U.S. patent application Ser. No. 15/219,246, filed Jul. 25, 2016, which is a divisional of U.S. Design patent application 29/568,321, filed Jun. 16, 2016, and which claims priority from U.S. Prov. App. 62/196,732, filed Jul. 7, 2015, and U.S. Prov. App. 62/196,813, filed Jul. 7, 2015, all of which are hereby incorporated by reference.

TECHNICAL FIELD OF THE INVENTION

The present invention relates to end caps for LED supports, and in particular, to cupped end caps for LED supports.

BACKGROUND OF THE INVENTION

Fluorescent lamps have been widely used in commercial sign cabinets to backlight signs. Fluorescent lamps are designed to be inserted into different types of sockets, such as bi-pin, center pin, or recessed double contact. The sockets provide mechanical support and electrical power to the lamp. While fluorescent lamps have high luminous efficiency, they also have a significant downside—their operation depends upon the use of mercury vapor which frequently requires such lamps to be treated as hazardous waste, requiring them to be segregated from other waste in order to ensure safe disposal or recycling.

Modern advancements in light-emitting-diode (LED) technology have allowed the creation of lamps that use less power yet have similar or greater luminous efficiency. The LEDs are typically mounted on an LED support, such as a rod or tube, that is inserted into the fluorescent lamp socket in the lamp cabinet. The support may use end caps, each having a first side that supports the LED support and a second side that fit into the fluorescent socket.

Having an end cap that fits into the fluorescent socket has disadvantages. The fluorescent socket is electrically live, unless they are disconnected, and inserting anything into a live socket can be hazardous. Also, there are different types of fluorescent sockets, and the end cap has to be designed to fit into a specific type of socket. Moreover, a socket may be missing or damaged and unable to support an LED support. The position of the LED sockets in a lamp cabinet are fixed by the locations of the sockets, which limits the placement of LED supports.

SUMMARY OF THE INVENTION

An object of the invention is to provide an end cap for LED light sticks for use in a sign cabinet.

An end cap for mounting an LED support in a sign cabinet comprises a support-mating portion for mating with an LED support, the support-mating portion including a hollow portion into which an LED support can be inserted and a protruding portion that protrudes into the LED support; and a cabinet-contacting portion opposite to the support-mating portion, the cabinet-contacting portion including a cup section for contacting the cabinet and supporting the end cap and LED support within the cabinet.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

Figure 1:
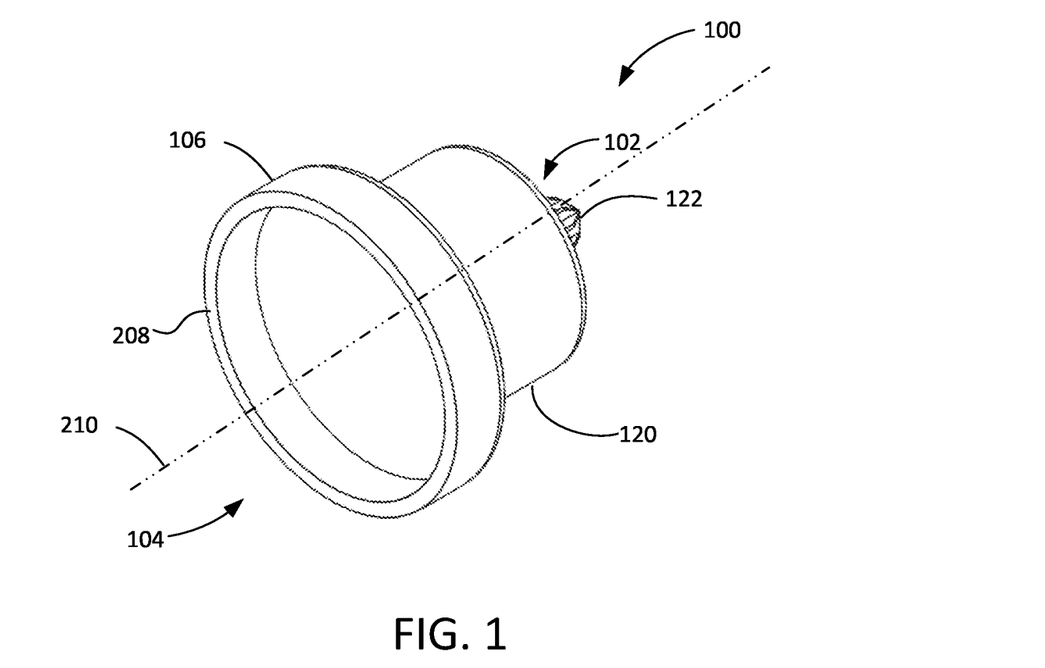
FIG. 1 is an isometric view of an embodiment of the current invention, an end cap for an LED support.

FIG. 1-6 show a first embodiment of an end cap 100 which can be attached to the end of an LED support to mount the LED support in a lamp cabinet. FIG. 1 shows an isometric view of end cap 100 for an LED support for mounting the LED support into a sign cabinet. End cap 100 includes a support-mating portion 102 for mating with an LED support (not shown) and a cabinet-contacting portion 104 opposite to the support-mating portion 102. In the embodiment of FIGS. 1-6, the support-mating portion 102 and the cabinet-contacting portion 104 are formed as a single integral part. The cabinet-contacting portion 104 includes a cup section 106 for contacting the cabinet and supporting the end cap 100 and LED support within the cabinet. The cup of cup section 106 is preferably sized to fit over a fluorescent lamp socket without engaging the socket. Because the cup does not engage the socket, the end cap can be used regardless of the type of existing sockets in the cabinet or in new cabinets with no sockets. The cup of cup section 106 can contact the lamp cabinet at any location and is not limited to being positioned over a fluorescent lamp socket. The support-mating portion 102 includes a cylindrical portion 120 and a protruding portion 122 which is shown more clearly in FIGS. 3, 4, and 6.

Figure 2:
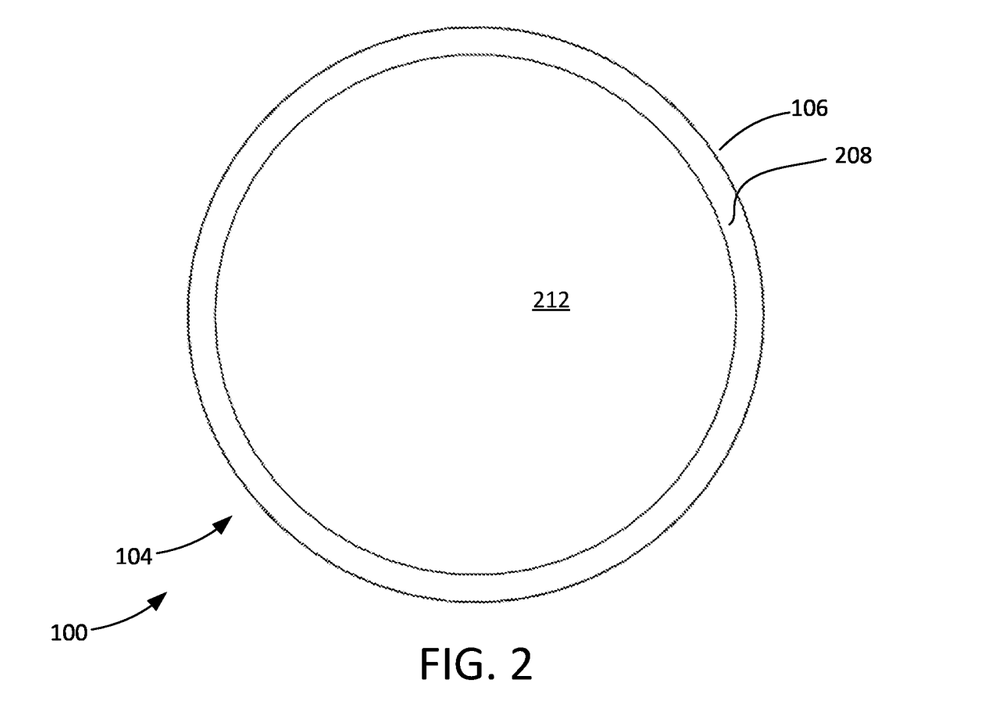
FIG. 2 is front elevation thereof.

FIG. 2 is front view of end cap 100, showing cup section 106 of the cabinet-contacting portion 104. The cup section 106 terminates in a flat edge surface 208 that is perpendicular to the major axis 210 of end cap. The cabinet-contacting portion 104 also includes a flat interior portion 212.

Figure 3:
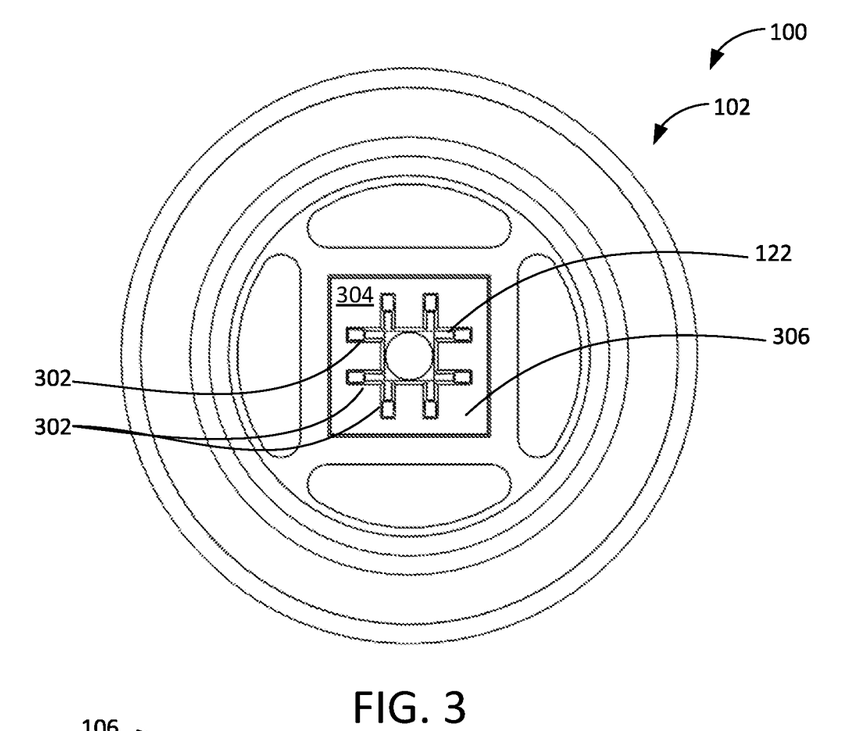
FIG. 3 is rear elevation thereof.
Figure 4:
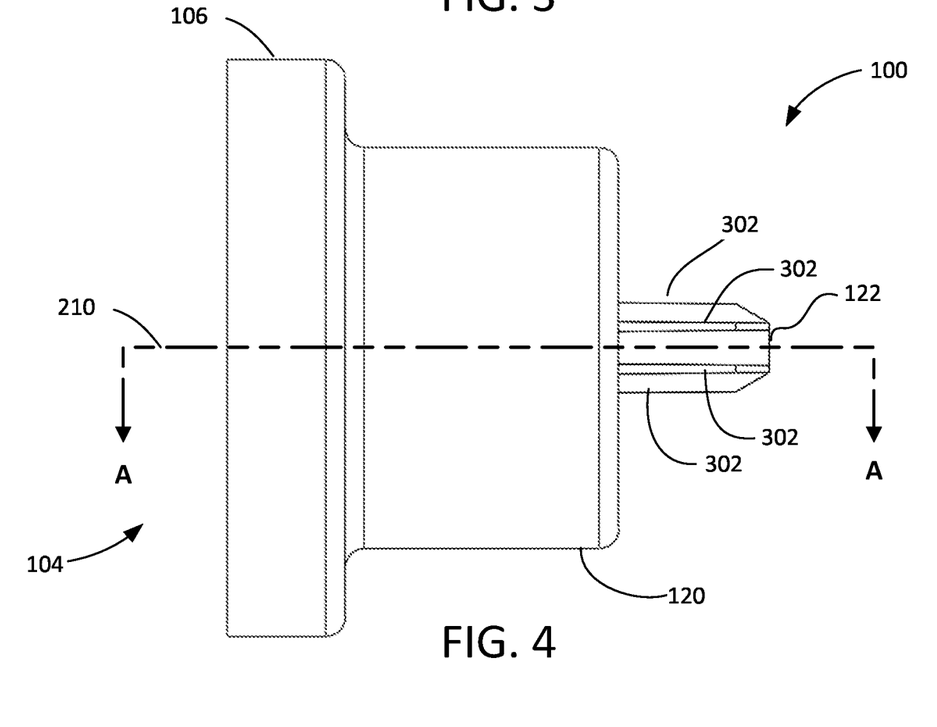
FIG. 4 is a right elevation thereof.
Figure 5:
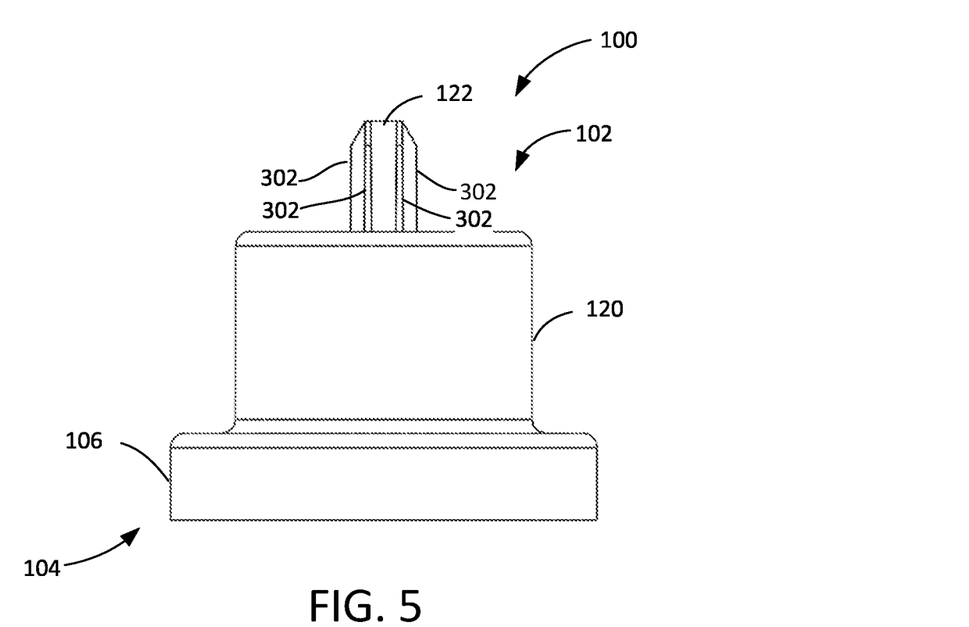
FIG. 5 is a top plan view thereof.
Figure 6:
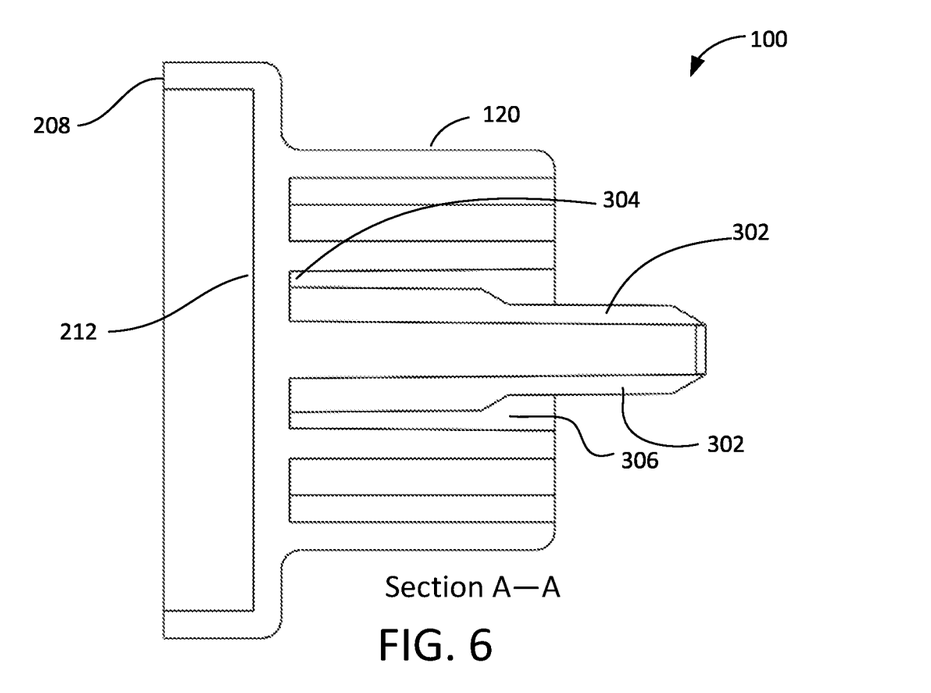
FIG. 6 is a cross-sectional view thereof.

FIG. 3 shows a rear view of end cap 100, showing the stick contacting portion straight on. As can be seen in FIG. 3, protruding portion 122 includes multiple fins 302 extending from an interior surface 304 of a rectangular channel 306. The multiple fins 302 form a "tic-tac-toe" grid pattern when viewed as in FIG. 3. Protruding portion 122 fits within an interior channel of a hollow, rectangular LED support (not shown) and the LED support fits into a rectangular channel 306. FIG. 4 shows a right side view and FIG. 5 is a top view of end cap 100. FIG. 6 is a cross-sectional view of end cap 100 taken along the line A-A of FIG. 4.

FIGS. 7-13 show an embodiment of an end cap 700 that includes a spring 705. The spring 705 allows an assembly of LED support with an end cap 700 to be compressed to fit into a sign cabinet and then to expand to be retained in a position in a lamp cabinet by friction. In some application an end cap without a spring, such as end cap 100 is applied to one end of the light stick and an end cap with a spring, such as the end cap shown in FIGS. 7-13 is applied to the second end of the light stick.

Figure 7:
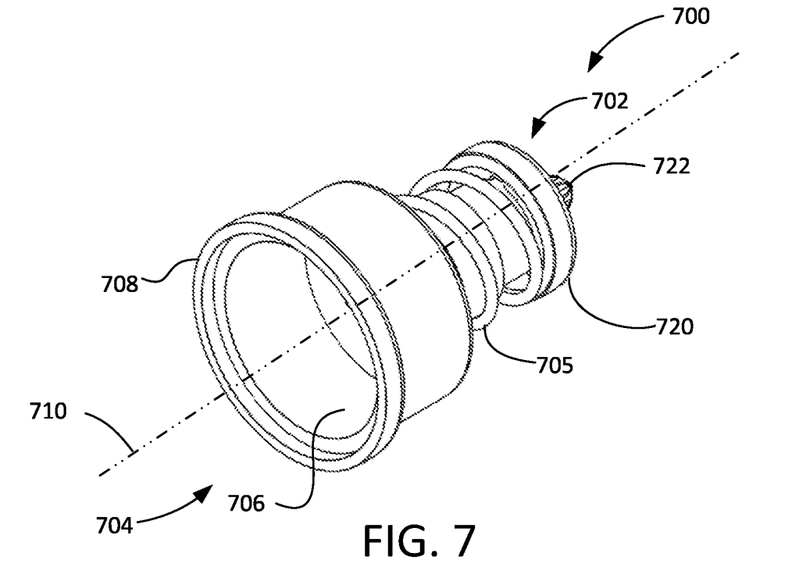
FIG. 7 is an isometric view of an additional embodiment of the current invention, an end cap for an LED support.

FIG. 7 shows an isometric view of an end cap 700 for an LED support for mounting the LED support into a sign cabinet. End cap 700 includes a support-mating portion 702 for mating with an LED support (not shown) and a cabinet-contacting portion 704 opposite to the support-mating portion 702. The support-mating portion 702 and the cabinet-contacting portion 704 are slidably connected, that is, they are free to move relative to each other for a small distance along an axis 710. A spring 705 biases support-mating portion 702 and the cabinet-contacting portion 704 apart until the motion is limited by a mechanical stop. When the support-mating portion 702, the cabinet-contacting portion 704 and spring 705 are assembled to make end cap 700, end cap 700 can be compressed against the force of the spring to reduce it length.

Cabinet-contacting portion 704 including a cup section 706 for contacting the cabinet and supporting the end cap 700 and LED support within the cabinet. Support-mating portion 702 includes a cylindrical portion 720 and a protruding portion 722.

Figure 8:
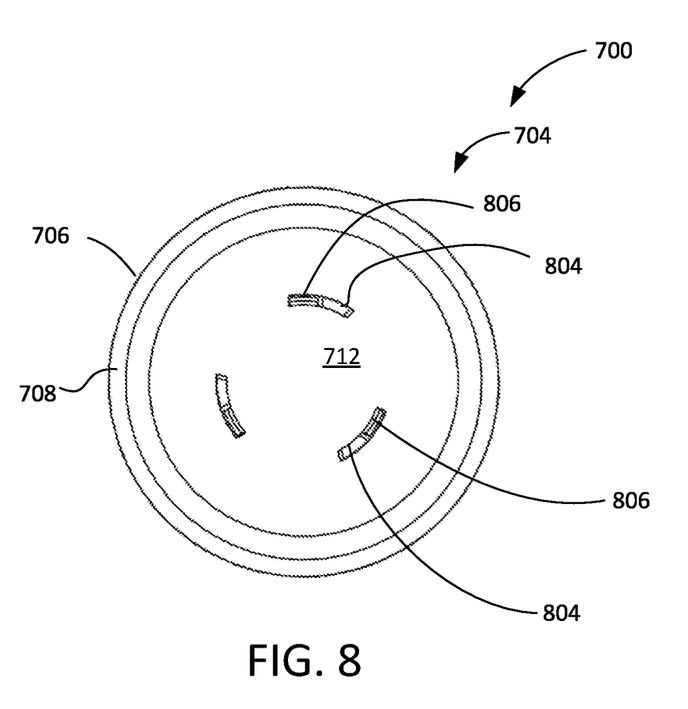
FIG. 8 is front elevation thereof.
Figure 12:
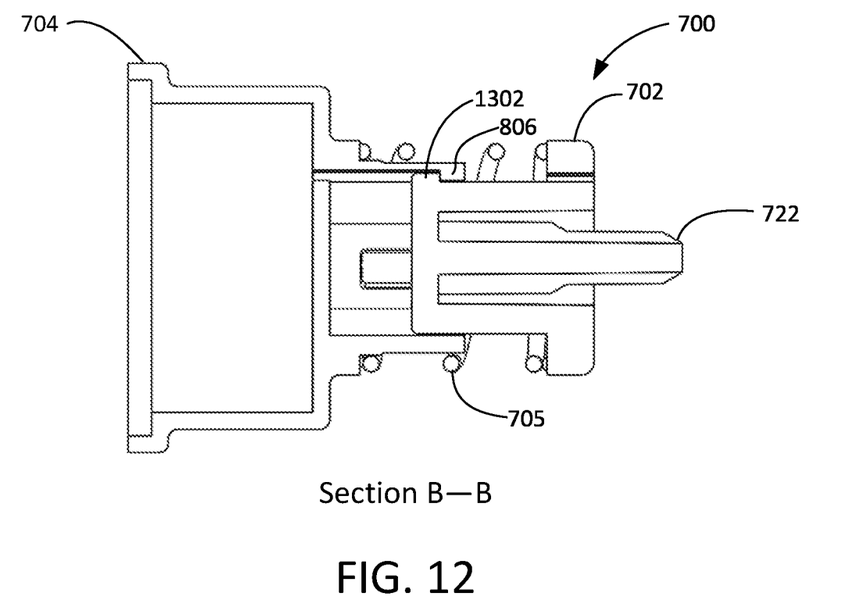
FIG. 12 is a cross-sectional view thereof.
Figure 13:
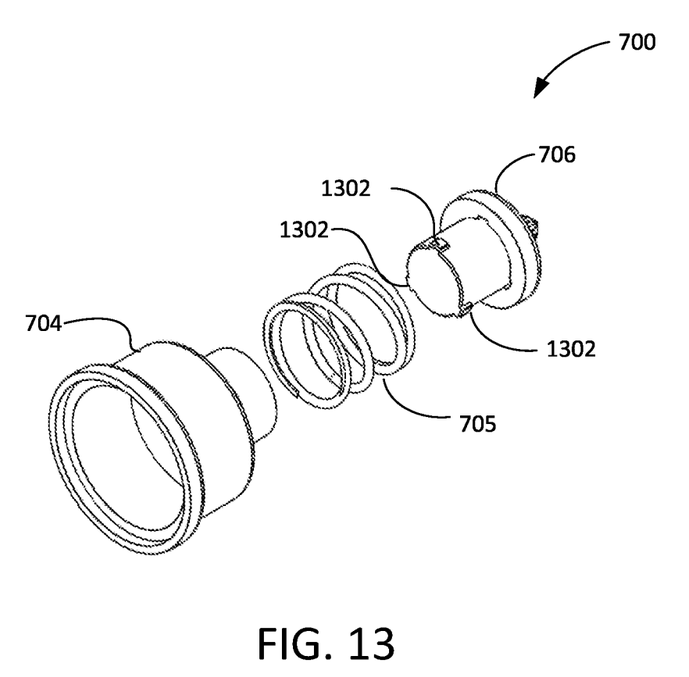
FIG. 13 is an exploded view thereof.

FIG. 8 is front view of end cap 700, showing cup section 706 of the cabinet-contacting portion 704. The cup section 706 terminates in a flat edge surface 708 that is perpendicular to the axis 710 of end cap 700. Flat edge 708 contacts the sign cabinet wall and the force from spring 705 keeps flat edge 708 pressed against the cabinet wall to maintain its position by friction. The cabinet-contacting portion 704 also includes a flat interior portion 712. FIG. 13 is an exploded view showing support-mating portion 702, cabinet-contacting portion 704, and spring 705. As can be seen in FIG. 13, support-mating portion 702 includes three bosses 1302 around its diameter. Bosses 1302 fit through circular slits 804 shown in FIG. 8, and then, after the stick-contacting portion 702 is rotated relative to the cabinet-contacting portion 704, each boss 1302 is maintained in a groove 806 by pressure from spring 705. FIG. 12 shows boss 1302 engaged in groove 806. This arrangement allows for support-mating portion 702 to be displaced from cabinet-contacting portion 704 against the spring force, so that the light stick with end caps can be compressed to fit into a lamp cabinet and then can expand to press edge 708 against the walls of the lamp cabinet to maintain the light stick in position.

Figure 9:
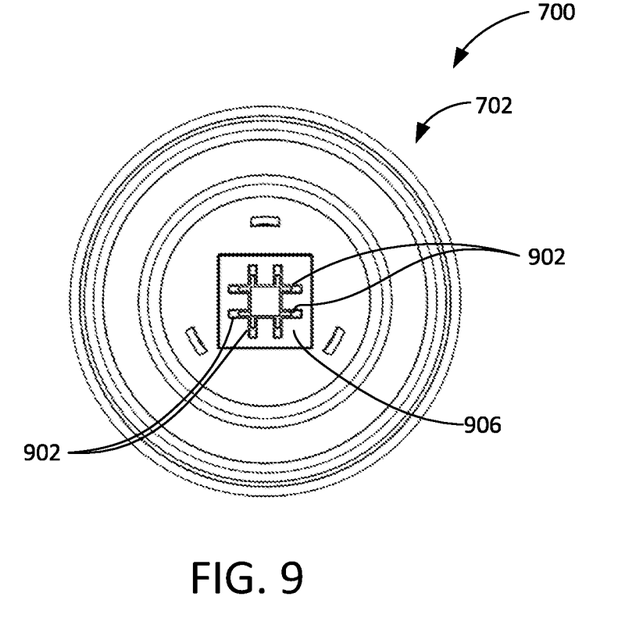
FIG. 9 is rear elevation thereof.

FIG. 9 shows a rear view of end cap 700, showing the stick contacting portion 702 straight on. As can be seen in FIG. 9, protruding portion 722 includes multiple fins 902 extending from an interior surface 304 (FIGS. 3 and 6) of a rectangular channel 306. The multiple fins 902 form a "tic-tac-toe" grid pattern when viewed as in FIG. 9. Protruding portion 722 fits within an interior channel of a hollow, rectangular LED support (not shown) and the light stick fits with rectangular depression 906.

Figure 10:
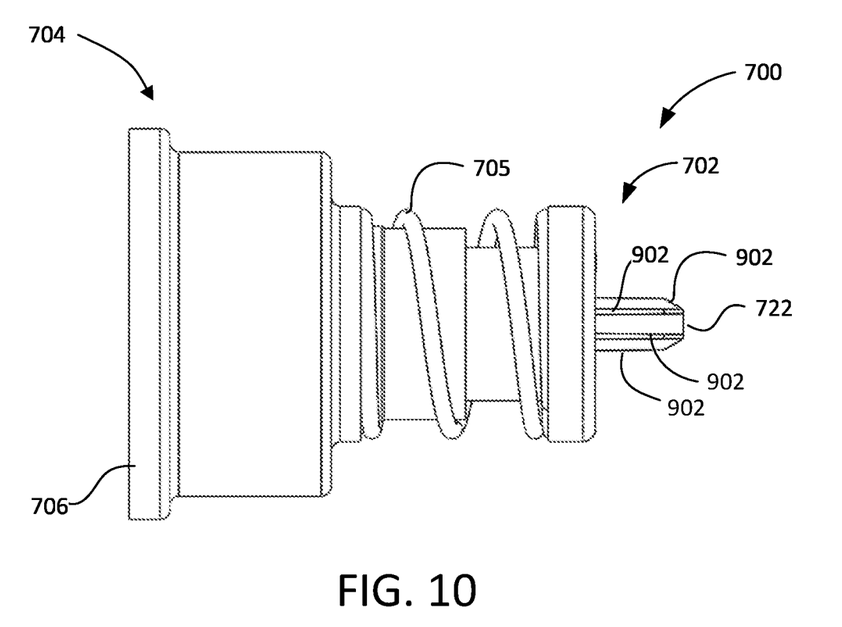
FIG. 10 is a right elevation thereof.
Figure 11:
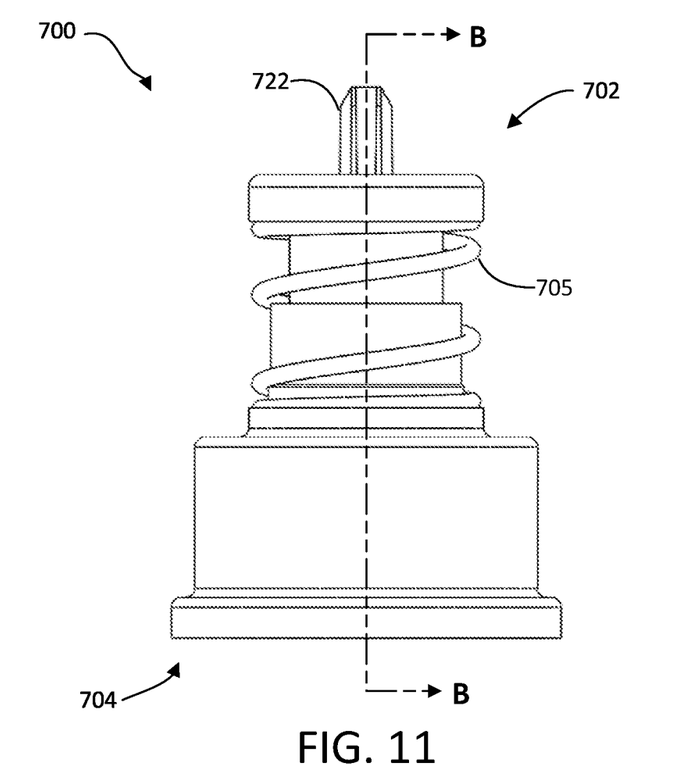
FIG. 11 is a top plan view thereof.

FIG. 10 is a right side view and FIG. 11 is a top view of the end cap 700. FIG. 12 is a cross-sectional of end cap 700 taken along the line B-B in FIG. 11.

Although embodiments of the present invention and their advantages are described in detail above and below, it should be understood that the described embodiments are examples only, and that various changes, substitutions and alterations can be made herein without departing from the spirit and scope of the invention as defined by the appended claims. The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention.

We claim as follows:

1. An end cap for mounting an LED support in a sign cabinet, comprising:
    a support-mating portion for mating with an LED support, the support-mating portion including a hollow portion into which an LED support can be inserted and a protruding portion that protrudes into the LED support;
    a cabinet-contacting portion opposite to the support-mating portion, the cabinet-contacting portion including a cup section for contacting the cabinet and supporting the end cap and LED support within the cabinet, the cup section sized to fit over a fluorescent lamp socket without engaging the fluorescent lamp socket.

2. The end cap of claim 1 in which the support-mating portion and the cabinet-contacting portion are formed as a single integral part.

3. The end cap of claim 1 in which the support-mating portion and the cabinet-contacting portion are separate, not integral, components.

4. The end cap of claim 3 further comprising a spring biasing the support-mating portion and the cabinet-contacting portion apart.

5. The end cap of claim 4 in which an assembly of the support-mating portion, the cabinet-contacting portion, and the spring are assembled such that the assembly can be compressed against a force of the spring.

6. The end cap of claim 4 in which the spring pushes the support-mating portion and the cabinet-contacting portion apart until a relative motion of the support-mating portion and the cabinet-contacting portion is limited by a mechanical stop.

* * * * *